(12) United States Patent
Ingram-Tedd et al.

(10) Patent No.: US 11,273,980 B2
(45) Date of Patent: Mar. 15, 2022

(54) METHOD AND APPARATUS FOR RETRIEVING UNITS FROM A STORAGE SYSTEM

(71) Applicant: OCADO INNOVATION LIMITED, Hatfield (GB)

(72) Inventors: Andrew John Ingram-Tedd, Hatfield (GB); Pawel Karolinczak, Hatfield (GB); Tom Clancy, Hatfield (GB)

(73) Assignee: OCADO INNOVATION LIMITED, Herts (GB)

( * ) Notice: Subject to any disclaimer, the term of this patent is extended or adjusted under 35 U.S.C. 154(b) by 59 days.

(21) Appl. No.: 16/083,723

(22) PCT Filed: Mar. 10, 2017

(86) PCT No.: PCT/EP2017/055697
§ 371 (c)(1),
(2) Date: Sep. 10, 2018

(87) PCT Pub. No.: WO2017/153583
PCT Pub. Date: Sep. 14, 2017

(65) Prior Publication Data
US 2019/0161273 A1    May 30, 2019

(30) Foreign Application Priority Data

Mar. 10, 2016    (GB) ...................................... 1604100

(51) Int. Cl.
*B65G 1/04*    (2006.01)
(52) U.S. Cl.
CPC ................................. *B65G 1/0464* (2013.01)

(58) Field of Classification Search
CPC .................................................... B65G 1/0464
See application file for complete search history.

(56) References Cited

U.S. PATENT DOCUMENTS 2,701,065 A    2/1955    Bertel
9,821,959 B2 *    11/2017    Hognaland ............. B60L 15/40
(Continued)

FOREIGN PATENT DOCUMENTS

| CN | 103612882 A | 3/2014 |
| CN | 205526130 U | 8/2016 |

(Continued)

OTHER PUBLICATIONS

Combined Search and Examination Report dated Sep. 1, 2017.
(Continued)

*Primary Examiner* — Jonathan Snelting
(74) *Attorney, Agent, or Firm* — Buchanan Ingersoll & Rooney PC

(57) ABSTRACT

A storage system includes a plurality of rails or tracks arranged in a grid pattern above the stacks of containers. The grid pattern includes a plurality of grid spaces and each stack is located within a footprint of only a single grid space. A load handling device is configured to move laterally on the rails or tracks above the stacks. The load handling device includes a container receiving space located above the rails or tracks in use and a lifting device arranged to lift a container from a stack into the container receiving space. The load handling device includes a mechanism for enabling lateral movement of the device in one of two transverse directions by enabling either a first or second set of wheels to selectively engage the first or second set of rails or tracks.

38 Claims, 14 Drawing Sheets

(56) References Cited

U.S. PATENT DOCUMENTS

| | | | |
|---|---|---|---|
| 10,000,337 B2* | 6/2018 | Lindbo | B65G 57/03 |
| 10,294,025 B2* | 5/2019 | Hognaland | B65G 1/0464 |
| 10,486,902 B2* | 11/2019 | Itoh | B65G 1/04 |
| 10,577,178 B2* | 3/2020 | Lindbo | B65G 1/0492 |
| 2014/0086714 A1* | 3/2014 | Malik | B65G 1/0478 |
| | | | 414/273 |
| 2014/0277693 A1* | 9/2014 | Naylor | B65G 1/0492 |
| | | | 700/218 |
| 2016/0194151 A1 | 7/2016 | Lindbo et al. | |
| 2017/0129702 A1 | 5/2017 | Hognaland | |

FOREIGN PATENT DOCUMENTS

| | | |
|---|---|---|
| EP | 0767113 A2 | 4/1997 |
| GB | 2520104 A | 5/2015 |
| GB | 2525309 A | 10/2015 |
| NO | 317366 B1 | 10/2004 |
| WO | 9849075 A1 | 11/1998 |
| WO | 2013167907 A1 | 11/2013 |
| WO | 2014090684 A1 | 6/2014 |
| WO | 2014152476 A1 | 9/2014 |
| WO | 2015019055 A1 | 2/2015 |
| WO | 2015193278 A1 | 12/2015 |
| WO | 2016010429 A1 | 1/2016 |
| WO | WO-2016098813 A1 * | 6/2016 ............... B65G 1/04 |

OTHER PUBLICATIONS

International Search Report (PCT/ISA/210) dated Jun. 16, 2017, by the European Patent Office as the International Searching Authority for International Application No. PCT/EP2017/055697.

Written Opinion (PCT/ISA/237) dated Jun. 16, 2017, by the European Patent Office as the International Searching Authority for International Application No. PCT/EP2017/055697.

First Office Action dated Mar. 9, 2021, by the Japanese Patent Office in corresponding Japanese Patent Application No. 2018-547977, and an English Translation of the Office Action. (9 pages).

Office Action (Notification of Reason for Refusal) dated Mar. 22, 2021, by the Korean Patent Office in corresponding Korean Patent Application No. 10-2018-7028859, and an English Translation of the Office Action. (6 pages).

Third Office Action dated Feb. 8, 2021, by the Chinese Patent Office in corresponding Chinese Patent Application No. 201780016442.7, and an English Translation of the Office Action. (5 pages).

Office Action (Examination report No. 1 for standard patent application) dated Jul. 22, 2021, by the Patent Office, Australian Government in corresponding Australian Patent Application No. 2017229536. (3 pages).

* cited by examiner

METHOD AND APPARATUS FOR RETRIEVING UNITS FROM A STORAGE SYSTEM

The present invention relates to apparatus for retrieving units form a storage system. In particular, but not exclusively, the invention relates to robotic devices for handling storage containers or bins in a store comprising a grid of stacked units.

This application claims priority from UK Patent Application No. GB1604100.6 filed on 10, Mar. 2016, the entire content of which is hereby incorporated by reference.

Some commercial and industrial activities require systems that enable the storage and retrieval of a large number of different products. One known system for the storage and retrieval of items in multiple product lines involves arranging storage bins or containers on rows of shelves arranged in aisles. Each bin or container holds a plurality of products of one product type. The aisles provide access between the rows of shelves, so that the required products can be retrieved by operatives or robots that circulate in the aisles. It will be appreciated, however, that the need to provide aisle space to access the products means that the storage density of such systems is relatively low. In other words, the amount of space actually used for the storage of products is relatively small compared to the amount of space required for the storage system as a whole.

In an alternative approach, which offers a significant improvement in storage density, containers are stacked on top of one another and the stacks are arranged in rows. The containers are accessed from above, removing the need for aisles between the rows and allowing more containers to be stored in a given space.

Methods of handling containers stacked in rows have been well known for decades. In some such systems, for example as described in U.S. Pat. No. 2,701,065, freestanding stacks of containers are arranged in rows in order to reduce the storage volume associated with storing such containers while still providing access to a specific container if required. Access to a given container is made possible by providing relatively complicated hoisting mechanisms which can be used to stack containers and to remove given containers from stacks. The cost of such systems are, however, impractical in many situations and they have mainly been commercialised for the storage and handling of large shipping containers.

The concept of using freestanding stacks of containers and providing a mechanism to retrieve and store specific containers has been developed further, for example as described in EP 0 767 113 B (Cimcorp). Cimcorp discloses a mechanism for removing a plurality of stacked containers using a robotic load handler in the form of a rectangular tube which is lowered around the stack of containers, and which is configured to be able to grip a container at any level in the stack. In this way, several containers can be lifted at once from a stack. The movable tube can be used to move several containers from the top of one stack to the top of another stack, or to move containers from a stack to an external location and vice versa. Such systems can be particularly useful where all of the containers in a single stack contain the same product (known as a single-product stack). The load handler can be used to move containers between single-product stacks, for example to add a plurality of containers containing a single type of product to the store, and to pick up one or more containers from two or more single-product stacks to create a multi-product output stack. An example of this is the picking of vegetable crates in a central warehouse to create a multi-product order for delivery to retail stores.

In the system described in Cimcorp, the height of the tube has to be as least as high as the height of the largest stack of containers, so that that the highest stack of containers can be extracted in a single operation. Accordingly, when used in an enclosed space such as a warehouse, the maximum height of the stacks is restricted by the need to accommodate the tube of the load handler. Furthermore, the system is not well adapted for the selection of a single container from a multi-product stack.

Online retail businesses selling multiple product lines, such as online grocers and supermarkets, require systems that are able to store tens or even hundreds of thousands of different product lines. The use of single-product stacks in such cases can be impractical, since a very large floor area would be required to accommodate all of the stacks required. Furthermore, it can be desirable only to store small quantities of some items, such as perishables or infrequently-ordered goods, making single-product stacks an inefficient solution.

Accordingly, for some applications, the use of multi-product stacks, in which the containers making up each stack may hold different products, is favoured in order to maximise the storage density of the system. The stored items must remain accessible reasonably quickly and easily, so that a plurality of different items required to fulfil a customer order can be picked from the storage system in an efficient way, even if some of the items required are stored in a lower level of a stack, underneath several other containers.

International patent application WO 98/049075A (Autostore), the contents of which are incorporated herein by reference, describes a system in which multi-product stacks of containers are arranged within a frame structure. A system of this type is illustrated schematically in FIGS. 1 to 4 of the accompanying drawings.

As shown in FIGS. 1 and 2, stackable containers, known as bins 10, are stacked on top of one another to form stacks 12. The stacks 12 are arranged in a grid frame structure 14 in a warehousing or manufacturing environment. FIG. 1 is a schematic perspective view of the frame structure 14, and FIG. 2 is a top-down view showing a stack 12 of bins 10 arranged within the frame structure 14. Each bin 10 typically holds a plurality of product items (not shown), and the product items within a bin 10 may be identical, or may be of different product types depending on the application.

The frame structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the frame structure 14, so that the frame structure 14 guards against horizontal movement of the stacks 12 of bins 10, and guides vertical movement of the bins 10.

The top level of the frame structure 14 includes rails 22 arranged in a grid pattern across the top of the stacks 12. Referring additionally to FIGS. 3 and 4, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 laterally in two dimensions in the horizontal X-Y plane, so that a load handling device 30 can be moved into position above any of the stacks 12.

The load handling devices 30 are further described in Norwegian patent number 317366, the contents of which are incorporated herein by reference. FIGS. 3(*a*) and 3(*b*) are schematic perspective views of a load handling device 30 from the rear and front, respectively, and FIG. 3(*c*) is a schematic front perspective view of a load handling device 30 lifting a bin 10.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, is arranged to engage with two adjacent rails of the first set 22*a* of rails 22. Similarly, a second set of wheels 36, consisting of a pair of wheels 36 on each side of the vehicle 32, is arranged to engage with two adjacent rails of the second set 22*b* of rails 22. Each set of wheels 34, 36 can be lifted and lowered, so that either the first set of wheels 34 or the second set of wheels 36 is engaged with the respective set of rails 22*a*, 22*b* at any one time.

When the first set of wheels 34 is engaged with the first set of rails 22*a* and the second set of wheels 36 is lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 is lifted clear of the rails 22, and the second set of wheels 36 is lowered into engagement with the second set of rails 22*a*. The drive mechanism can then be used to drive the second set of wheels 36 to achieve movement in the Y direction.

The load handling device 30 is equipped with a crane device 40. The crane device 40 comprises a cantilever arm 42 that extends laterally from the top of the vehicle 32. A gripper plate 44 is suspended from the cantilever arm 42 by four cables 46. The cables 46 are connected to a winding mechanism (not shown) housed within the vehicle 32. The cables 46 can be spooled in or out from the cantilever arm 42, so that the position of the gripper plate 44 with respect to the vehicle 32 can be adjusted in the Z direction.

The gripper plate 44 is adapted to engage with the top of a bin 10. For example, the gripper plate 44 may include pins (not shown) that mate with corresponding holes (not shown) in the rim that forms the top surface of the bin 10, and sliding clips (not shown) that are engageable with the rim to grip the bin 10. The clips are driven to engage with the bin 10 by a suitable drive mechanism housed within the gripper plate 44, which is powered and controlled by signals carried through the cables 46 themselves or through a separate control cable (not shown).

To remove a bin 10 from the top of a stack 12, the load handling device 30 is moved as necessary in the X and Y directions so that the gripper plate 44 is positioned above the stack 12. The gripper plate 44 is then lowered vertically in the Z direction to engage with the bin 10 on the top of the stack 12, as shown in FIG. 3(*c*). The gripper plate 44 grips the bin 10, and is then pulled upwards on the cables 46, with the bin 10 attached. At the top of its vertical travel, the bin 10 is accommodated beneath the cantilever arm 42 and is held above the level of the rails 22. In this way, the load handling device 30 can be moved to a different position in the X-Y plane, carrying the bin 10 along with it, to transport the bin 10 to another location. The cables 46 are long enough to allow the load handling device 30 to retrieve and place bins from any level of a stack 12, including the floor level. The vehicle 32 is sufficiently heavy to counterbalance the weight of the bin 10 and to remain stable during the lifting process. The weight of the vehicle 32 may be comprised in part of batteries that are used to power the drive mechanism for the wheels 34, 36.

As shown in FIG. 4, a plurality of identical load handling devices 30 are provided, so that each load handling device 30 can operate simultaneously to increase the throughput of the system. The system illustrated in FIG. 4 includes two specific locations, known as ports 24, at which bins 10 can be transferred into or out of the system. An additional conveyor system (not shown) is associated with each port 24, so that bins 10 transported to a port 24 by a load handling device 30 can be transferred to another location by the conveyor system, for example to a picking station (not shown). Similarly, bins 10 can be moved by the conveyor system to a port 24 from an external location, for example to a bin-filling station (not shown), and transported to a stack 12 by the load handling devices 30 to replenish the stock in the system.

Each load handling device 30 can lift and move one bin 10 at a time. If it is necessary to retrieve a bin 10 ("target bin") that is not located on the top of a stack 12, then the overlying bins 10 ("non-target bins") must first be moved to allow access to the target bin 10.

Each of the load handling devices 30 is under the control of a central computer. Each individual bin 10 in the system is tracked, so that the appropriate bins 10 can be retrieved, transported and replaced as necessary.

The system described with reference to FIGS. 1 to 4 has many advantages and is suitable for a wide range of storage and retrieval operations. In particular, it allows very dense storage of product, and it provides a very economical way of storing a huge range of different items in the bins 10, while allowing reasonably economical access to all of the bins 10 when required for picking.

For high-volume systems in which speed of operation is critical, it is important to maximise the performance of each of the load handing devices, in terms of speed of operation, battery life, reliability, lifting capacity, stability and so on. It may therefore be desirable to provide load-handling devices that offer improved performance in one or more of these areas.

It may also be desirable to increase the number of load handling devices in use at any one time, to allow an increase in the speed with which items can be retrieved from the storage system. For example, the Applicant's co-pending International Patent Application No. PCT/GB2013/051215, the content of which is incorporated herein by reference, describes a storage system in which a plurality of each of two different types of load handling device are provided. One type of load handling device is adapted to lift a plurality of bins from a stack in one operation, to allow a target bin in the stack to be accessed by a single-bin load handling device of the second type. In such cases, it may be desirable to reduce the size of the load handling devices in order to minimise instances in which the optimum movement path for one device is hindered by the presence of other devices.

It is against this background that the present invention has been devised.

According to the invention there is provided a load-handling device for lifting and moving containers stacked in stacks in a storage system, the system comprising a plurality of rails or tracks arranged in grid pattern above the stacks of containers, the grid pattern comprising a plurality of grid spaces, each stack being located within a footprint of only a single grid space, the load handling device being configured to move laterally on the rails or tracks above the stacks, the load handling device further comprising a lifting mechanism, the lifting mechanism comprising a gripper device, the gripper device being configured to grip a container from above, characterised in that the load-handling device comprises a vehicle comprising a body having an upper portion and a lower portion the upper portion for housing components such as power components, and/or control components, and/or drive components and/or lifting components the lower portion arranged directly beneath the upper portion, the lower portion comprising a cavity for accommodating a container and a wheel assembly, the wheel assembly comprising a first set of wheels for engaging with a first set of rails or tracks to guide movement of the device in a first direction and a second set of wheels for engaging with a second set of rails or tracks to guide movement of the device in a second direction, wherein the second direction is transverse to the first direction; and the lifting mechanism being configured to raise and lower the gripper device relative to the cavity, the lifting mechanism being located above the cavity, the wheel assembly further comprises a wheel positioning mechanism, the wheel positioning mechanism comprising means for selectively engaging either the first set of wheels with the first set of rails or tracks or the second set of wheels with the second set of rails or tracks thereby enabling the load handling device to selectively move in either the first or second direction across the grid.

From one aspect, the present invention concerns load handling devices for use in storage systems comprising a grid frame containing a plurality of stacks of containers. The load handling devices are arranged above the stacks of containers and are capable of lifting a container from a stack and moving the container laterally to another location. Advantageously, each load handling device occupies only a single grid space in the storage system.

A load handling device according to an embodiment of the invention includes a container-receiving space into which a container can be lifted. The container-receiving space is arranged beneath a vehicle module, in which components such as power components, control components, drive components and lifting components are housed.

By arranging the bulky components of the load handling device above the container-receiving space, the footprint of the load handling device is reduced compared to the cantilever designs shown in FIGS. 3(a) to 3(c) and described in NO317366, in which the bulky components are housed in a vehicle module disposed to one side of the container-receiving space. Advantageously, the load handling device of the invention occupies the space above only one stack of containers in the frame, in contrast to the cantilever design shown in FIGS. 3(a) to 3(c) which occupies the space above two stacks. This means that, by virtue of the invention, the efficiency of operation of the storage system can be improved, because the reduced footprint allows more load handling devices to be accommodated and reduces the likelihood of one device obstructing the optimum path of another.

The load handling device preferably includes a set of wheels for supporting the load handling device above the stacks. For example, lateral movement of the load handling device may be guided by rails disposed above the frame. The rails may be arranged in a grid pattern, allowing two-dimensional movement of the load handling device in the horizontal plane. The wheels may engage with the rails. Two sets of wheels may be provided, with one set being arranged to engage with a first set of rails to guide movement of the second handling device in a first direction, and another set being arranged to engage with a second set of rails to guide movement of the second handling device in a second direction.

The wheels are arranged at the periphery of the container-receiving space. In one aspect of the invention, the wheels may be driven by one or more motors housed in the vehicle module and drive may be transferred from the motors in the vehicle module to the wheels by drive transfer means disposed around the container-receiving space. For example, the drive transfer means may comprise a suitable arrangement of pulleys and drive belts.

One or both set of wheels may be configured to be raised and lowered with respect to the other set of wheels. One or more wheel lift motors or other wheel lift devices may be housed in the vehicle module for this purpose.

The vehicle module may house a winch or crane device for lifting the container into the container-receiving space. The crane device may include one or more motors for lifting the container, and the or each motor of the crane device may be housed in the vehicle module.

The crane device may include a gripper device configured to grip a container from above. The gripper device may be suspended from cables that can be extended and retracted from the vehicle to move the gripper device vertically.

The load handling device is equipped with a lifting device arranged to lift a single container from the stack into the container-receiving space. The lifting device may comprise a pair of lifting arms arranged on either side of the container-receiving space, in which case the lifting device may comprise a gripper device mounted between the ends of the arms and arranged to grip a container from above.

The lifting device comprises rods or cables arranged to engage with vertical channels formed in the side walls of the containers. The channels may be accessed by apertures in a top face of each container. In such an arrangement, vertically-extending spaces in the storage system are not necessary.

The rods or cables may carry an anchor mechanism arranged to engage releasably with a container. For example, the anchor mechanism may comprise one or more laterally-extendable arms for engaging a surface of the container. The anchor mechanism may be operated remotely, for example by a wire that extends through a tubular bore of the rod or cable.

The load handling device further comprises an upper part, a lower part including a container-receiving space, and winch means for lifting a container into the container-receiving space. The winch means comprises a winch motor which is housed in the upper part, above the container-receiving space. The lower part includes a wheel assembly to facilitate lateral movement of the load handling device with respect to the frame, and the upper part also includes at least one motor for driving one or more wheels of the wheel assembly.

The lower part may comprise a frame structure for supporting the wheels of the wheel assembly. The frame structure may be arranged around the container-receiving space. For example, the container-receiving space may be bounded on four sides by the frame structure. One or more elements of the frame structure may be moveable to raise and lower a first set of the wheels with respect to a second set of the wheels, thereby to facilitate engagement of either the first set of wheels or the second set of wheels with a first or a second set of rails or tracks, respectively. The moveable elements of the frame structure may be driven by a motor housed in the upper part of the load handling device.

The load-handling device of the invention is preferably a self-propelled robot vehicle.

From another aspect, the invention resides in a storage system comprising a frame containing a plurality of stacks of containers, and one or more load handling devices as described above. Each load handling device occupies a single grid space, corresponding to the area occupied by only one stack of containers.

In another aspect, the invention comprises a storage system comprising a frame containing a plurality of stacks of containers, a first handling device capable of lifting a plurality of containers from a stack in a single operation, and a second handling device capable of lifting a single container and moving the container laterally. The first and second handling devices are disposed above the frame and are independently moveable to access different stacks. The second handling device is of the type described above, and occupies a space corresponding to only one stack of containers.

In this aspect, the provision of a first handling device capable of lifting a plurality of containers from a stack in a single operation along with a second handling device capable of lifting a single container and moving the container laterally provides an optimum solution when seeking to retrieve a container which is located in the middle or bottom of a stack. In such a case, only two lifting operations need be carried out to retrieve the target container, which greatly increases the speed and efficiency of the retrieval process compared to prior art arrangements in which only one container can be lifted at a time.

The storage system may further comprise one or more port locations at which containers can be removed from and/or added to the storage system. The load handling device of the invention may be capable of transporting a target container from a stack to a port location. The containers may comprise open-topped bins. The containers may be arranged to interlock or engage with one another in the vertical direction when formed in a stack.

In a typical application, multiple handling devices may be employed so that multiple containers can be lifted and moved simultaneously. The handling devices may be of different types, and may be selected to balance the cost and energy consumption of the system with the speed and flexibility of operation. One benefit of the present invention is that, because the load handling devices occupy the space above only one stack, the efficiency of a multiple-device system can be improved compared to prior art load handling device designs which occupy two or more stack spaces. The gain in efficiency may arise from being able to accommodate more load handling devices in a given system, from optimising the routing of the device using the space gained by the reduced device footprints, or from a combination of these factors.

Preferred and/or optional features of each aspect of the invention may be used, alone or in appropriate combination in the other aspects of the invention also.

Figure 1:
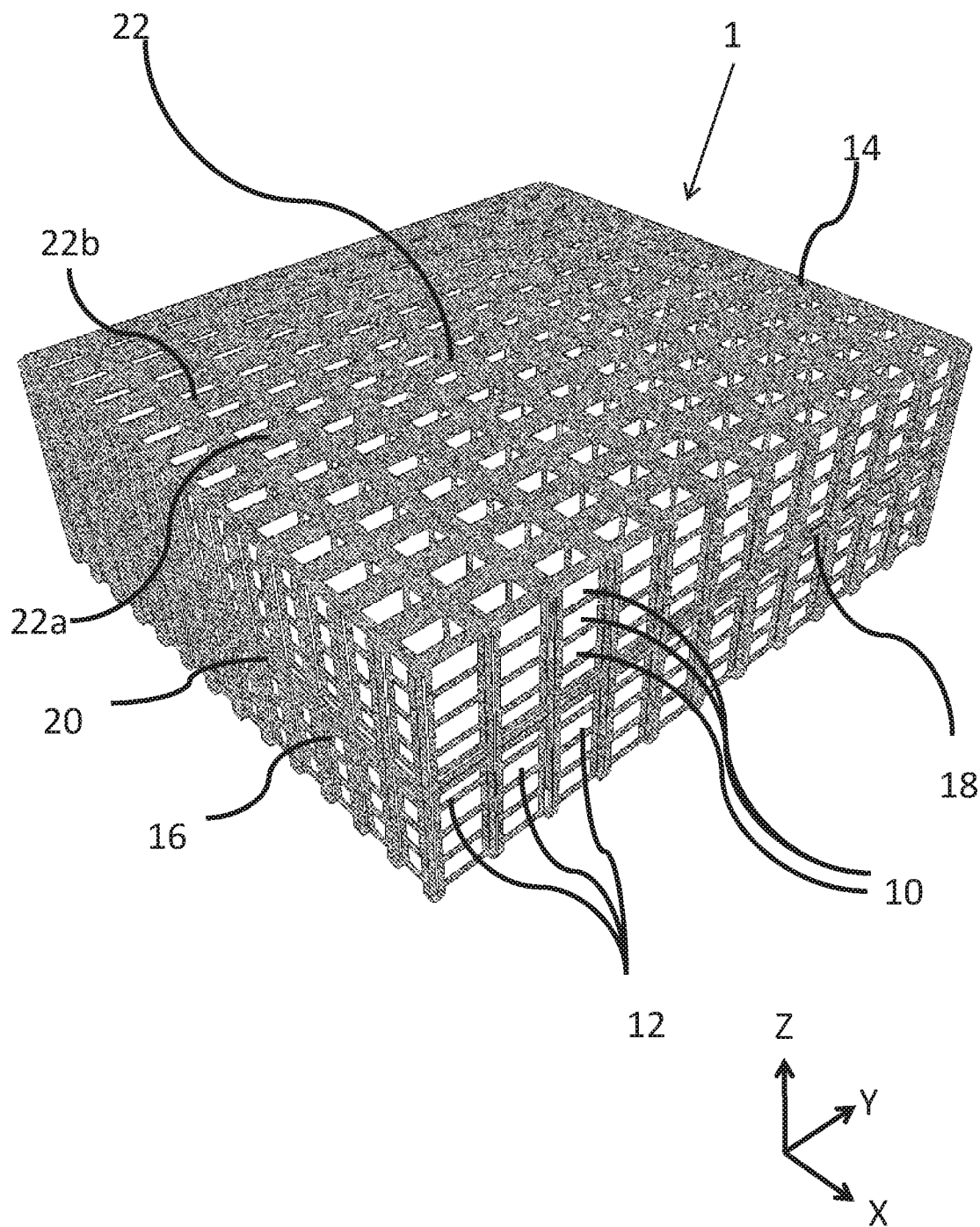
FIG. 1 is a schematic perspective view of a frame structure for housing a plurality of stacks of bins in a known storage system.
Figure 2:
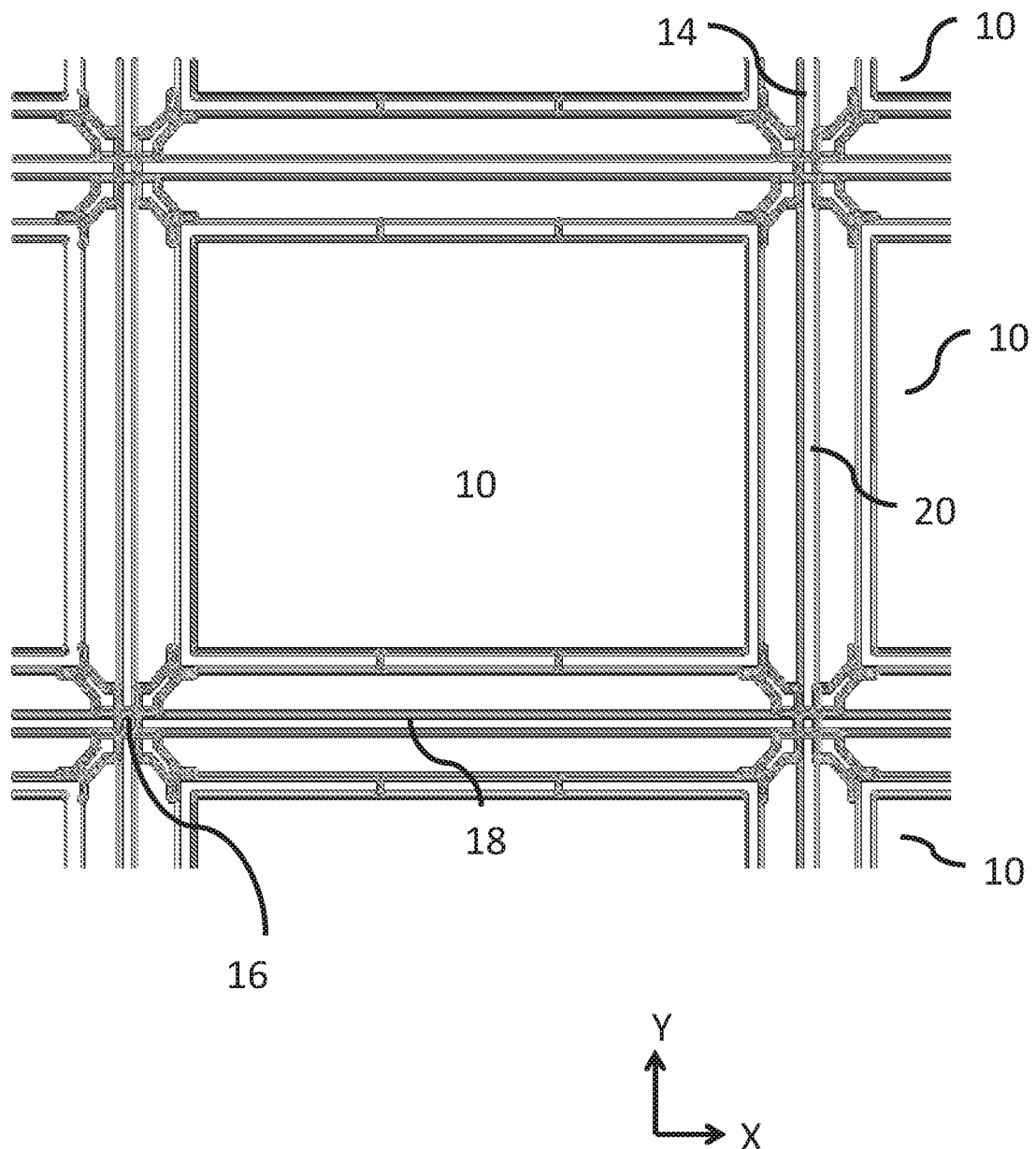
FIG. 2 is a schematic plan view of part of the frame structure of FIG. 1.
Figure 3A:
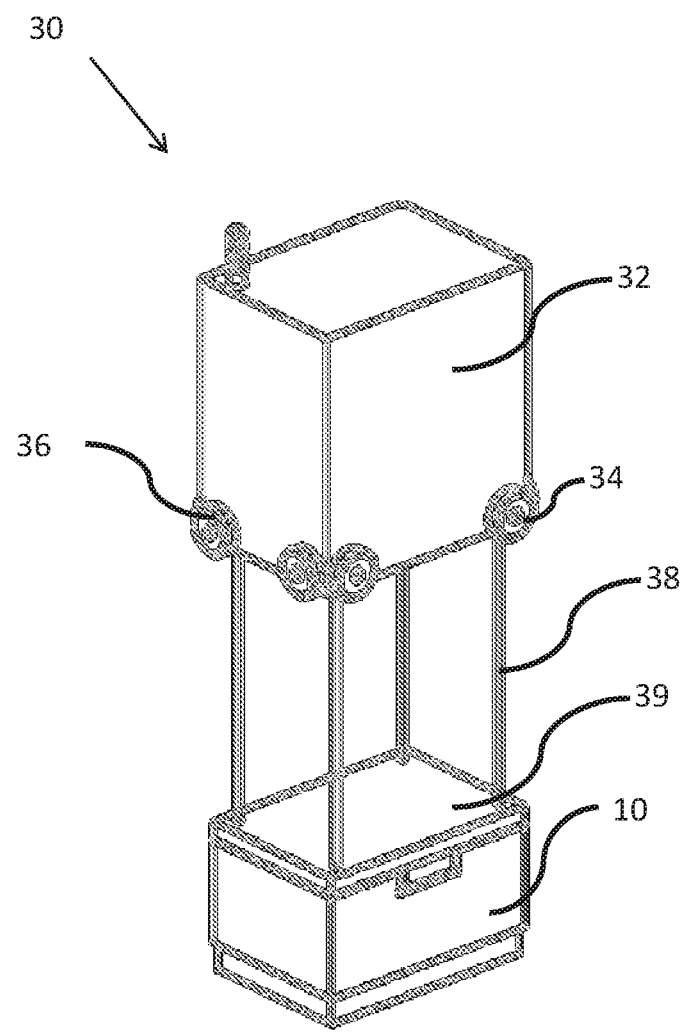
Figures 3B, 3C:
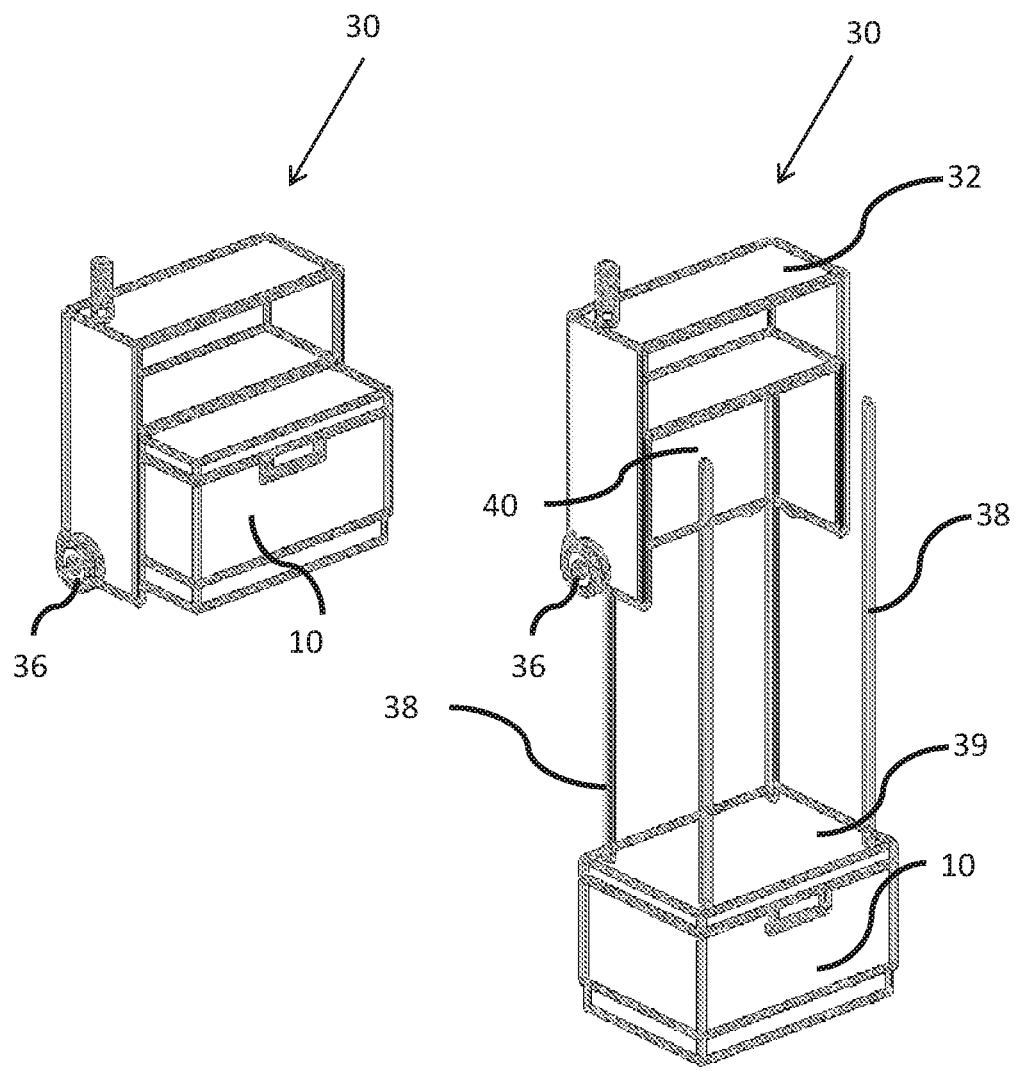
Figure 4:
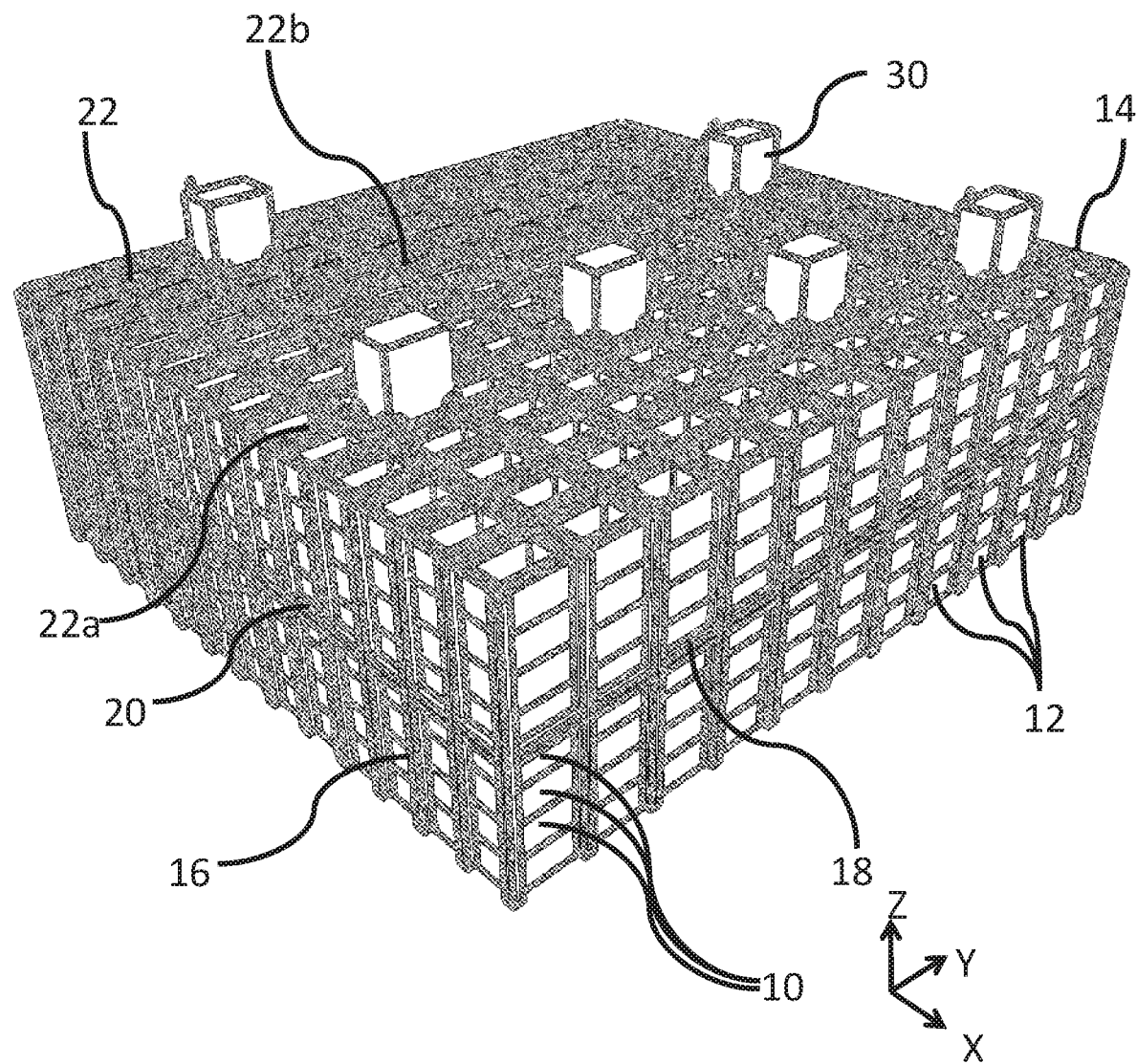

FIGS. 3(a) and 3(b) are schematic perspective views, from the rear and front respectively, of a known load handling device for use with the frame structure of FIGS. 1 and 2, and FIG. 3(c) is a schematic perspective view of the known load handling device in use lifting a bin; and FIG. 4 is a schematic perspective view of a known storage system comprising a plurality of load handling devices of the type shown in FIGS. 3(a), 3(b) and 3(c), installed on the frame structure of FIGS. 1 and 2.

Figure 5:
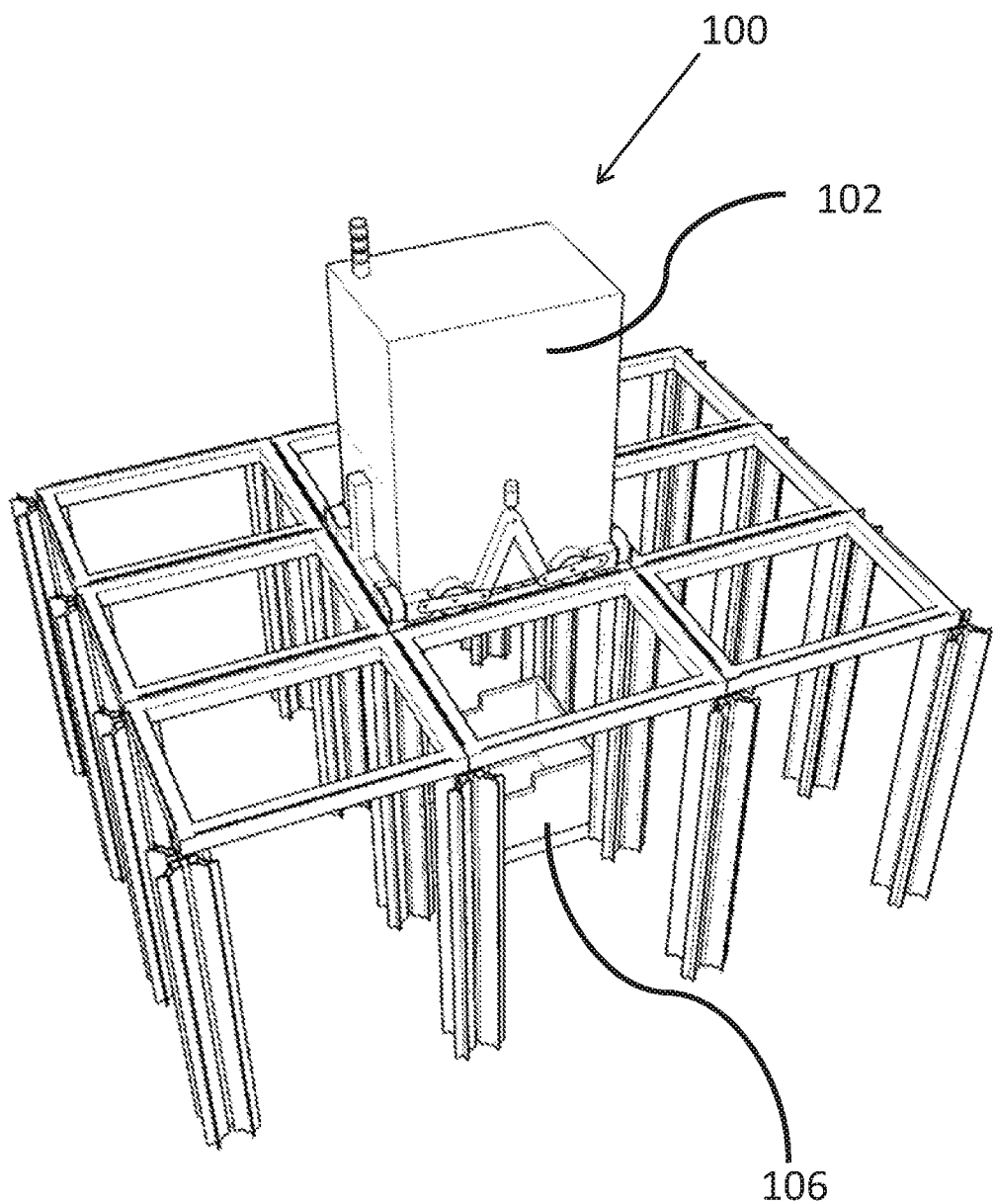
Figure 6:
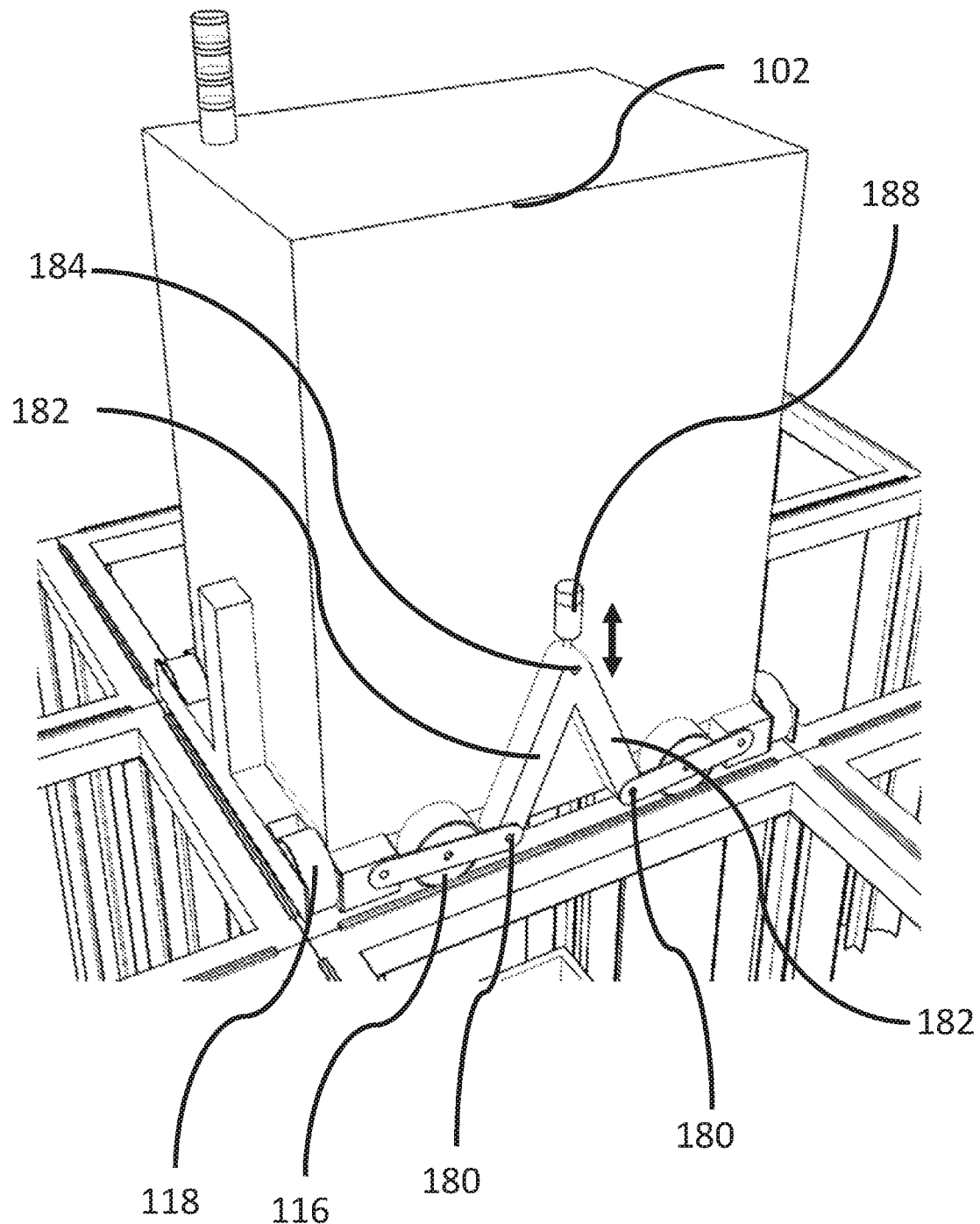
Figure 7:
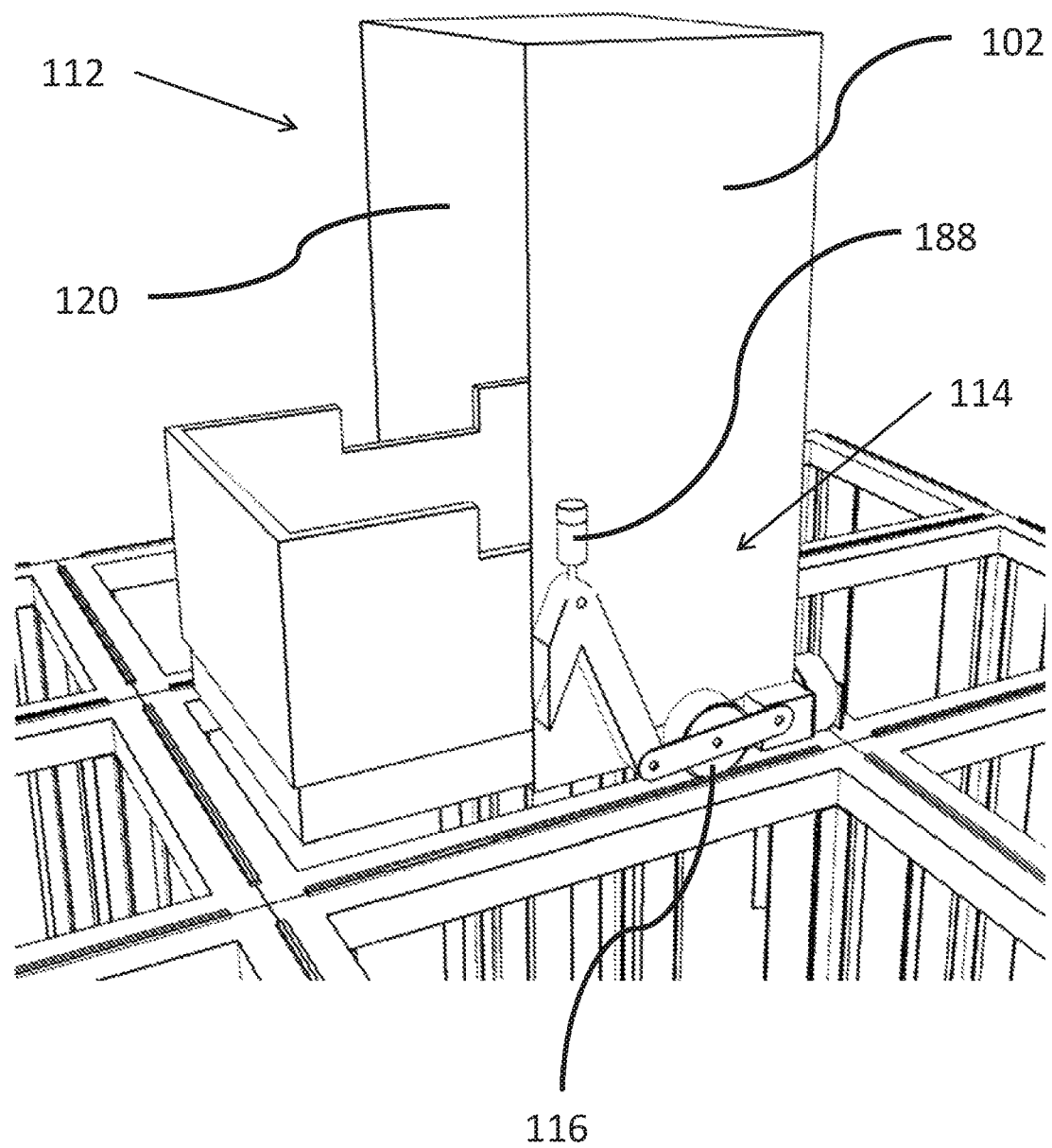
Figure 8:
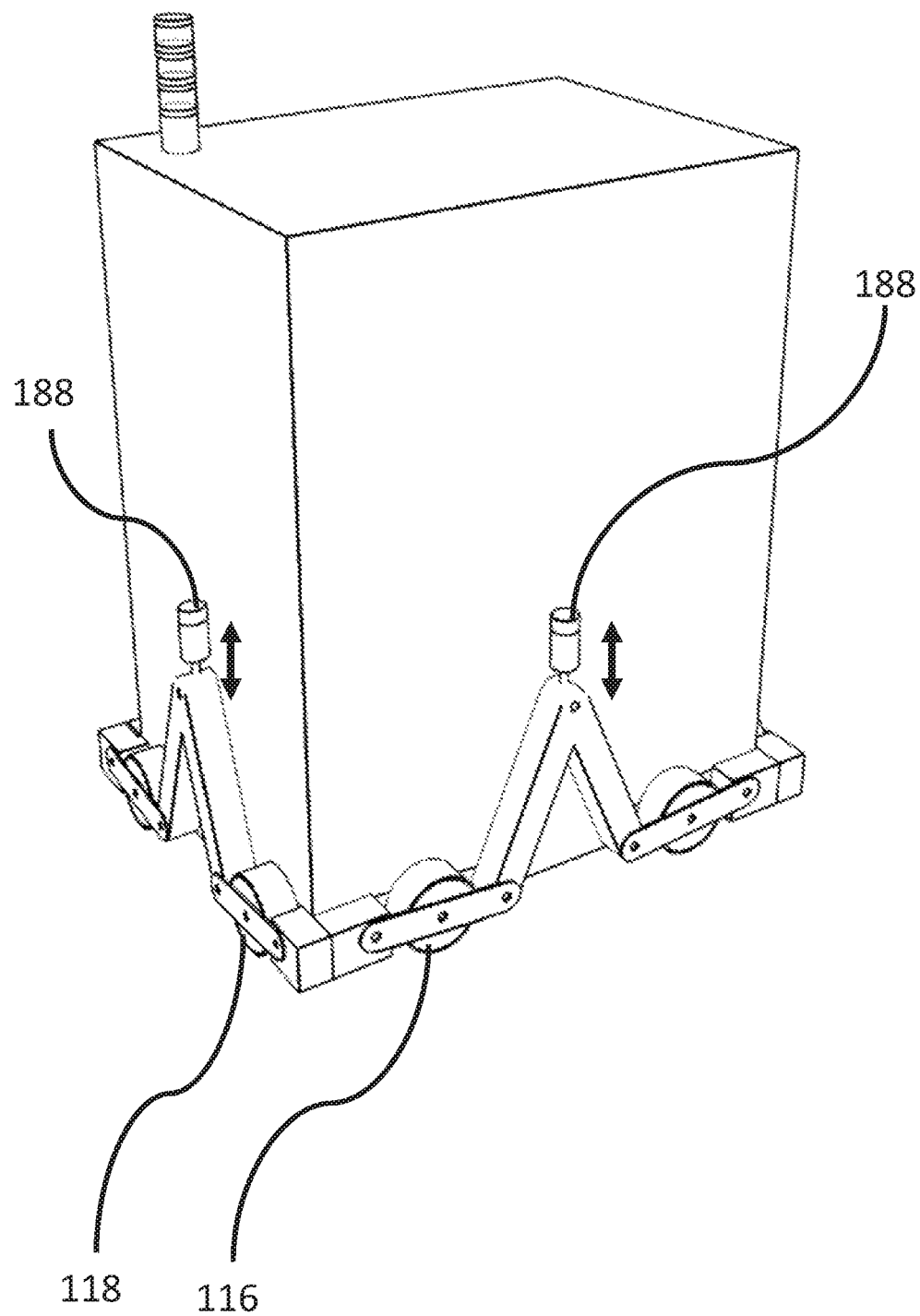
Figure 9:
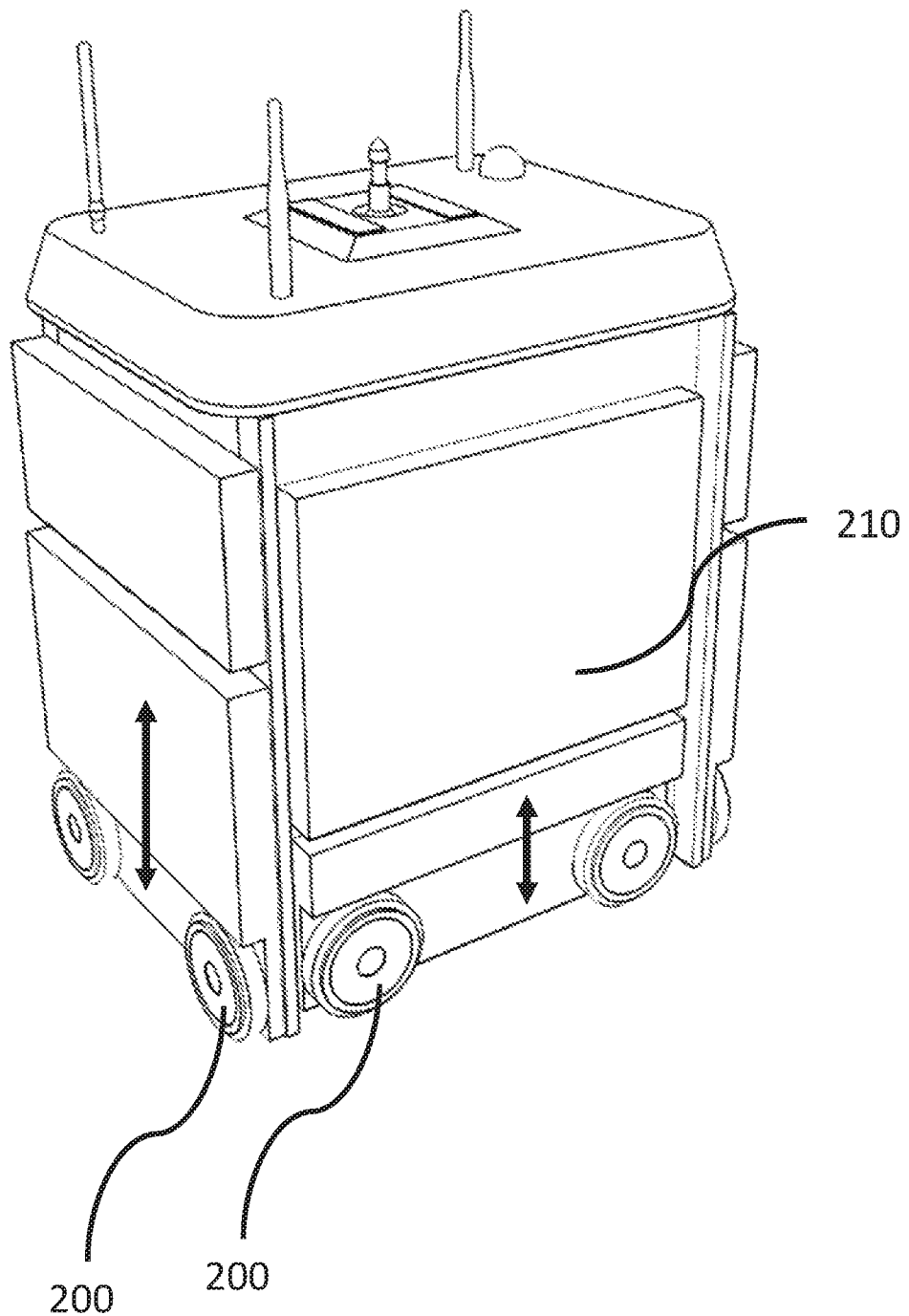
Figure 10:
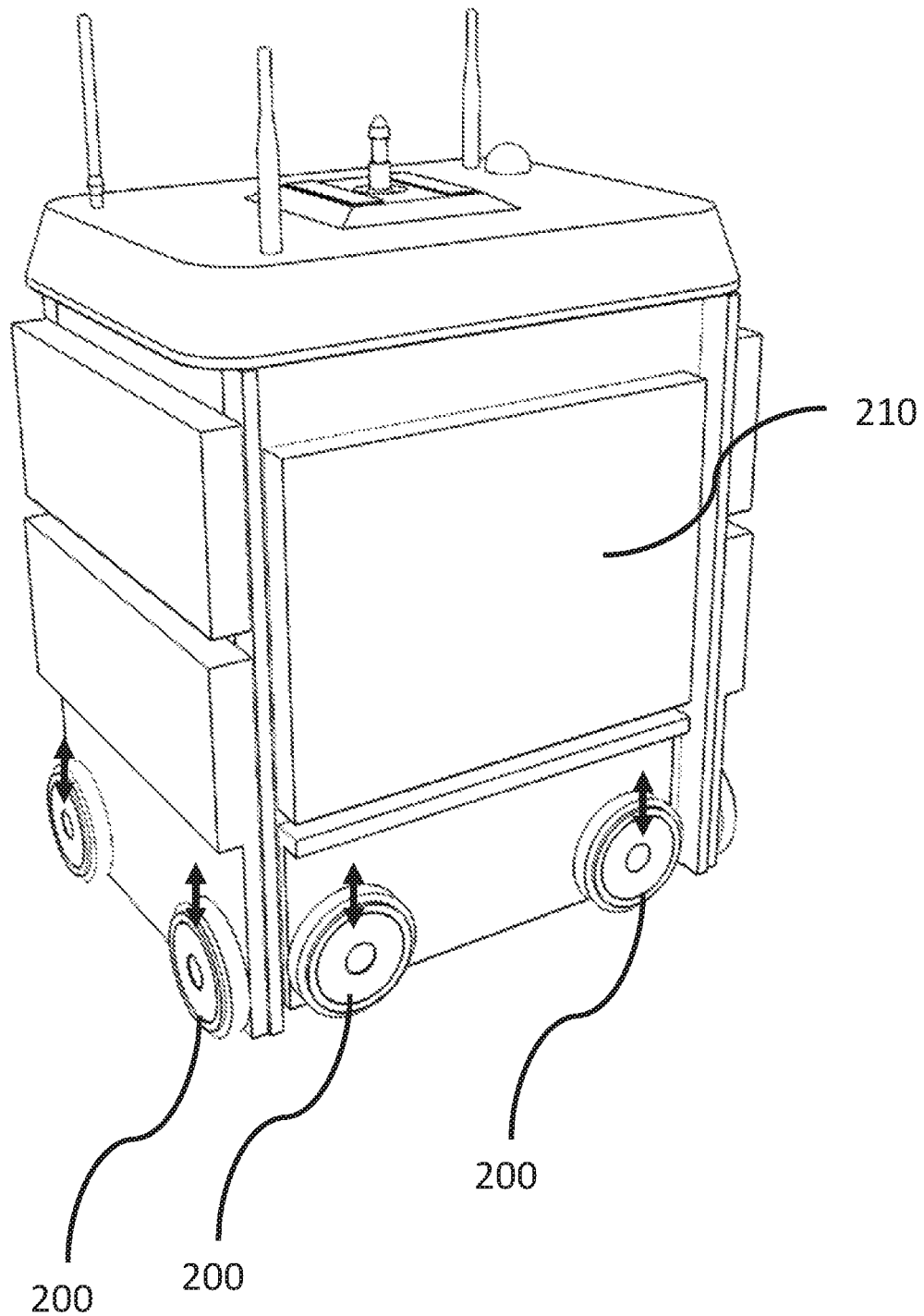
Figure 11:
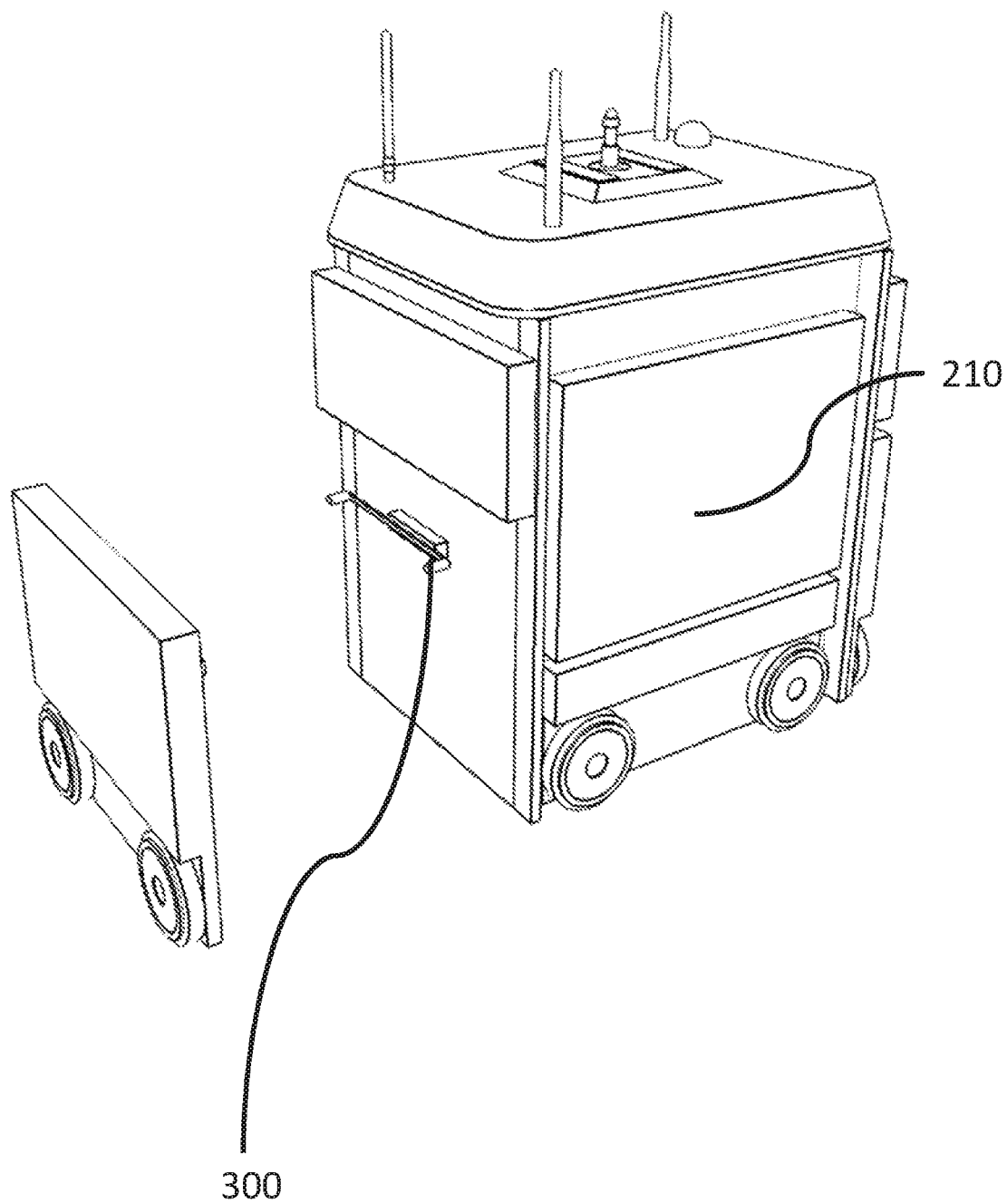
Figure 12:
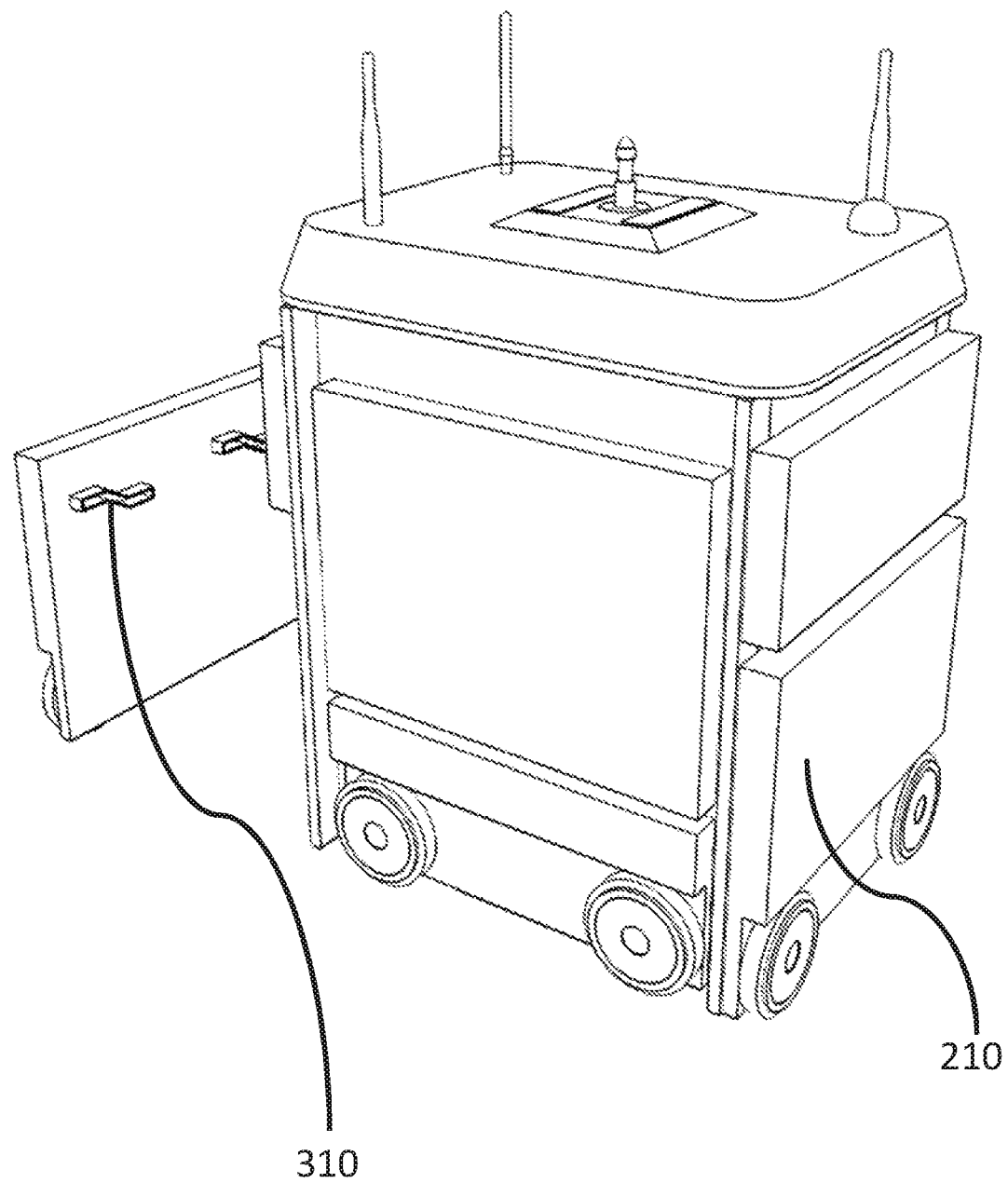
Figure 13A:
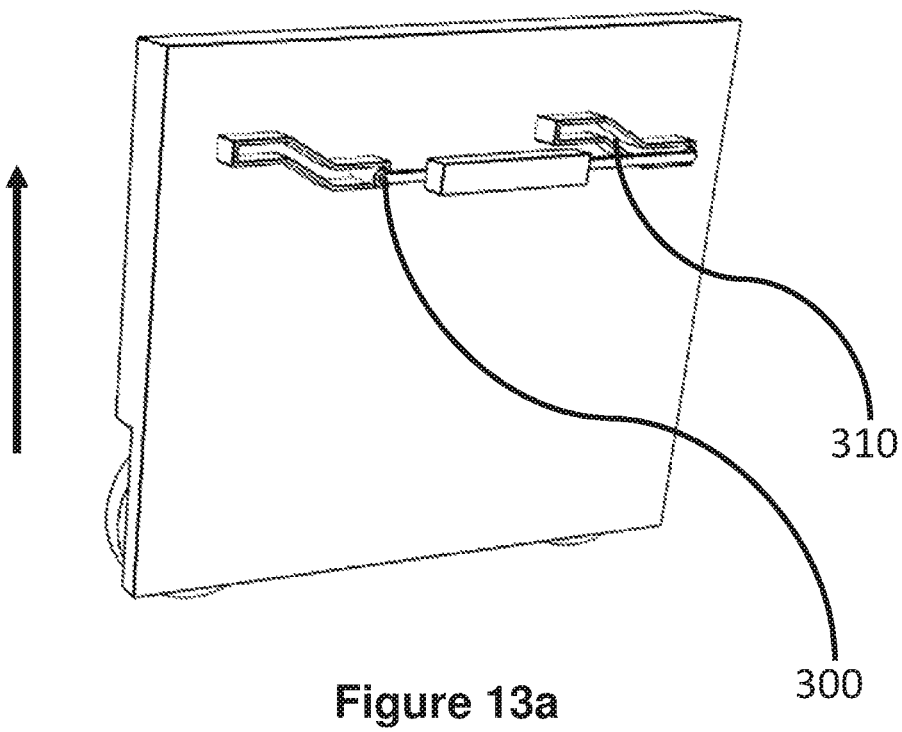
Figure 13B:
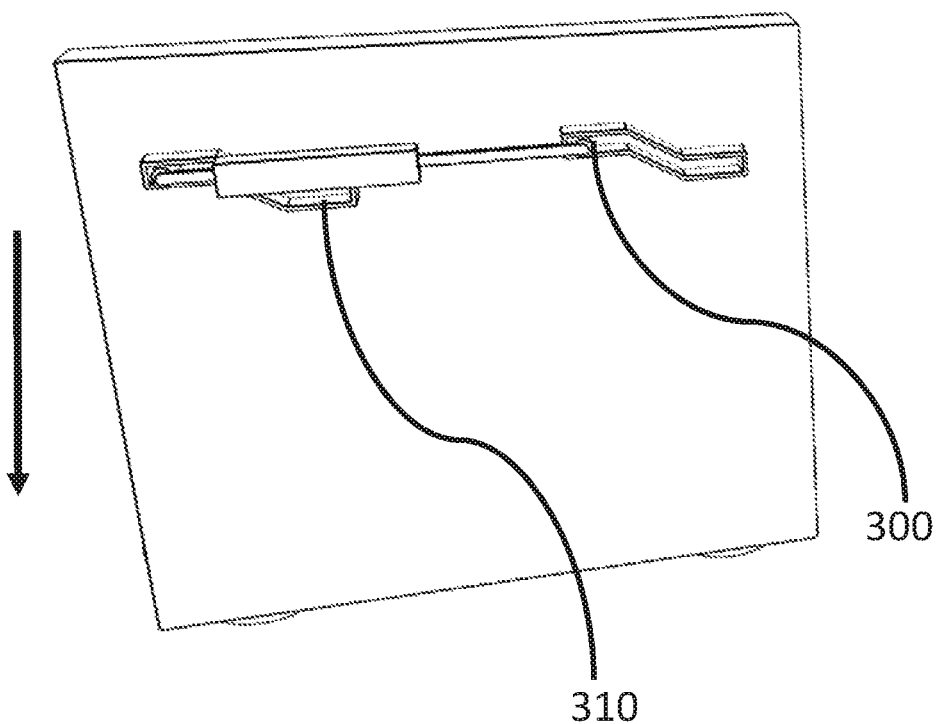

Embodiments of the present invention will now be described, by way of example only, with reference to the remainder of the accompanying drawings, in which like reference numerals are used for like features, and in which:

FIG. 5 is a schematic perspective view of a load handling device according to an embodiment of the invention;

FIG. 6 is a schematic perspective view of the load handling device of FIG. 5, showing one possible system architecture of the device;

FIG. 7 is a schematic perspective cut away view of the load handling device of FIGS. 5 and 6, the load handling device;

FIG. 8 is a schematic perspective view of a second embodiment of the invention, the load handling device comprising four displacement motors each motor acting on a set of wheels on one side of the load handling device;

FIG. 9 is a schematic perspective view of a third embodiment of the invention, the load handling device comprising 4 moveable sides each side comprising displacement mechanisms driven by a motor located within the load handling device;

FIG. 10 is a schematic perspective view of a fourth embodiment of the invention, the load handling device comprising two sets of wheels, each set of wheels comprising 4 individually driven wheels, each wheel comprising a mechanism for engaging or disengaging the wheel with the tracks;

FIGS. 11 to 13 show schematic perspective views of a fifth embodiment of the invention, the load handling device comprising four sides, each side comprising two wheels, each side being liftable and lowerable with respect to the other sides by a mechanical solenoid and pin system.

FIG. 5 shows a load handling device 100 according to an embodiment of the invention. The load handling device 100 comprises a vehicle 102 equipped with a winch or crane mechanism to lift a storage container or bin 106, also known as a tote, from above. The crane mechanism includes winch cables and a grabber plate. The grabber plate is configured to grip the top of the container 106 to lift it from a stack of containers 106 in a storage system of the type shown in FIGS. 1 to 4. It will be appreciated that the ride height of the load handling device changes when the moving means 188 is activated.

Referring also to FIGS. 6 and 7, the vehicle 102 comprises an upper part 112 and a lower part 114.

The lower part 114 is fitted with two sets of wheels 116, 118, which run on rails provided at the top of the frame of the storage system. At least one wheel of each set 116, 118 is driven to enable movement of the vehicle 102 in X- and Y-directions respectively along the rails. As will be explained below, one set of wheels 116 can be moved vertically to lift the set of wheels 116 clear of the respective rails leaving the remaining set of wheels in contact with the rails, thereby allowing the vehicle 102 to change direction.

The wheels 116, 118 are arranged around the periphery of a cavity or recess 120, known as a container-receiving recess, in the lower part 114. The recess 120 is sized to accommodate the bin 106 when it is lifted by the crane mechanism 104, as shown in FIG. 6(a). When in the recess 120, the bin 106 is lifted clear of the rails beneath, so that the vehicle 102 can move laterally to a different location. On reaching the target location, for example another stack, an access point in the storage system or a conveyor belt, the bin 106 can be lowered from the recess 120 (as shown in FIG. 6(b)) and released from the grabber plate 110.

The upper part 112 of the vehicle 102 houses all of the significant bulky components of the load handling device, as shown in FIG. 6(c). The upper part 112 houses the battery and associated electronics, controllers and communications devices, motors for driving the wheels 116, 118, motors for driving the crane mechanism 104, and other sensors and systems.

In this way, the footprint of the vehicle 102 is larger than the size of a bin 106 only enough to accommodate the wheels 116, 118 either side of the recess 120. In other words, the vehicle 102 occupies a single grid space in the storage system. In this way, the vehicle 102 therefore takes up the minimum possible amount of space in the X-Y plane.

The load handling devices 100 of the invention can also offer improved stability, as the mechanical components displacing the or each set of wheels with respect to each other are located in the lower part 114 of the load handling device.

In the first embodiment of the invention as shown in FIGS. 5 to 7 the first set of wheels 116 can be raised clear of the rails or lowered onto the rails by means of a wheel positioning mechanism. Each wheel 116 is mounted on an arm 180 that is pivotally mounted at its outer end. An inner end of each arm 180 is connected to the lower end of a respective linkage 182. The upper ends of both linkages 182 are connected to the lower end of a common linkage 184. In turn, the upper end of the common linkage 184 is moved by a motor or solenoid or worm gear or lead screw mechanism or any suitable means for drawing the common linkage upwards. By operating the moving means 188 to draw the common linkage 184 upwards, the first set of wheels 116 can be raised so that the second set of wheels 118 alone is engaged with the rails, allowing movement of the vehicle 102 in the Y-direction. By operating the motor 188 to push the common linkage 184 downwards, the first set of wheels 116 move downwards to engage with the rails and to lift the vehicle so that the second set of wheels 118 is lifted clear of the rails, as shown in The vehicle 102 can then move in the X-direction.

The wheels 118 of the second set are mounted to fixed T-pieces 190 disposed at either end of the lower part 114 of the vehicle 102.

In the embodiment shown in FIG. 7, it will be appreciated that two motors 118 are required, one to move two of the wheels of the set 116 of wheels and one to move the remaining two of the wheels of the set 116 disposed on the opposite side of the load handling device. In this way, one displacement motor acts to lift half a set of wheels only. It will be appreciated that the motors 188 may operate independently, each one lifting or lowering half a set of wheels at any time. However in order to efficiently change direction the motors 188 operate independently but at the same time to lift the wheels clear of the tracks.

It will be appreciated that in this embodiment of the invention the mechanism for displacing the wheels is disposed in the lower part of the vehicle body. In this way, additional weight is disposed lower down in the vehicle body thereby improving the stability of the load handling device.

FIG. 8 shows a second embodiment of the invention in which the wheels disposed on each side of the load handling device each comprise the mechanism only associated with one set of wheels in the previous embodiment described with reference to FIGS. 5 to 7. In this embodiment it will be appreciated that each side of the load handling device will therefore require a displacement motor and a linkage mechanism as described with reference to FIGS. 5 to 7. It will be appreciated that this provides additional stability to the load handling device as each side comprises the same mechanism and motor means, the weight being evenly distributed. The embodiment of FIG. 8 shows a load handling device in which 4 motor means are provided each acting on half a set of wheels 116, 118.

FIG. 9 shows a third embodiment of the invention in which the two wheels disposed on each side of the load handling device are rotatably attached to moveable side panels that comprise the sides of the load handling device. Two wheels 200 mounted in a frame structure 210 of a load handling device according to another embodiment of the invention. As in the previous embodiments, in this embodiment the load handling device comprises a vehicle with an upper part 112 that houses the major components of the device and a lower part having a recess 120 for accommodating a bin, with the wheels 200 being arranged on four sides of the recess.

In this case, the frame structure of the load handling device comprises two parallel panels that accommodate the wheels 200 there between. Drive means is provided to transfer drive to the wheels 200 from a motor housed in the upper part 112 of the vehicle. It will be appreciated that the drive means provided in the upper part of the load handling device may act on two wheels 200 on one side of the load handling device at any one time. In this way, a single motor means located above the cavity may act on half a set of wheels 116 or two motors may be provided each motor acting on half a set of wheels 116.

Referring additionally to FIG. 10, in a fourth embodiment of the invention each wheel 200 may be provided with displacement means to enable each wheel 200 to be independently lifted or lowered and engaged or disengaged with the track as required. In this embodiment the wheels 200 each comprise drive means and displacement means. Again, in using mechanisms and components positioned in the lower part of the load handling device the stability of the device is improved.

Referring to FIGS. 11 to 13, a fifth embodiment of displacement means for the wheels 200 or sets of wheels 116 and 118 is described. FIG. 11 shows a two wheels disposed on each side of the load handling device, attached to moveable side panels that comprise the sides of the load handling device. As can be seen in FIGS. 12 and 13, the panels further comprise a pin and track mechanism, the pins locating in the tracks when the panels are in situ on the sides of the load handling devices.

The panels further comprise a motor or solenoid that moves the pin laterally in the track, the shape of the track in the inside of the panels and the movement of the pins in the tacks causing the side panels to be displaced upwardly or downwardly depending on the direction of travel of the pin in the track. This movement in the panel causing the wheels associated with each panel to lift off the track or engage the track accordingly.

In this way, the wheels 200 in this embodiment can be raised and lowered by moving the panels independently at the same time or opposing panels being connected so as to move together, relative to the upper part 112 of the vehicle. The panels are mounted to a body 230 of the upper part 112 of the vehicle by way of rails 232. The rails 232 are fixed to the body 230, and pin is slidably mounted to the rails 232.

Although in some of the Figures only one side of the load handling device is shown, it will be appreciated that an identical structure would be provided on the opposite side of the vehicle. Both structures may be raised and lowered by a common motor, so the four wheels 200 can be lifted and lowered in unison to control engagement of this first set of wheels 200 with rails extending in a first direction across the frame. It will be appreciated that two opposing panels may be raised and lowered by a single motor, the other two opposing panels being raised and lowered by a further motor. Furthermore, each of the four panels may be provided with a motor to independently raise and lower each panel.

It will be appreciated that in all the embodiments described above, the motors may be replaced by solenoids or worm gears or lead screw mechanisms or belt driving systems or any other suitable means for driving the displacement mechanism.

It will be appreciated that many different variations and modifications are possible. For example, both sets of wheels may be powered by a single motor, with a suitable transfer arrangement to direct power to the appropriate set of wheels. Instead of a motor, the mechanism used to lift the wheels may use linear actuators, such as linear motors or hydraulic rams.

Other variations and modifications not explicitly described above will also be apparent to the skilled reader.

The invention claimed is:

1. A load-handling device for lifting and moving containers stacked in stacks in a storage system, the storage system having a plurality of rails or tracks arranged in grid pattern above the stacks of containers, the grid pattern having a plurality of grid spaces, each stack being located within a footprint of only a single grid space, the load handling device being configured to move laterally on the rails or tracks above the stacks, the load handling device comprising:
   a lifting mechanism, the lifting mechanism having a gripper device configured to grip a container from above;
   a vehicle body having an upper portion and a lower portion, the upper portion for housing components including power components, and/or control components, and/or drive components and/or lifting components, and the lower portion arranged directly beneath the upper portion, the lower portion having a cavity for accommodating a container and a wheel assembly, the wheel assembly having a first set of wheels, consisting of a pair of wheels on a front of the vehicle body and a pair of wheels on a back of the vehicle body, for engaging with a first set of rails or tracks to guide movement of the device in a first direction and a second set of wheels, consisting of a pair of wheels on each side of the vehicle body, for engaging with a second set of rails or tracks to guide movement of the device in a second direction, wherein the second direction is transverse to the first direction;
   the lifting mechanism being configured to raise and lower the gripper device relative to the cavity, the lifting mechanism being located above the cavity; and
   the wheel assembly having a wheel positioning mechanism, the wheel positioning mechanism having:
      means for selectively engaging either the first set of wheels with the first set of rails or tracks or the second set of wheels with the second set of rails or tracks thereby enabling the load handling device to selectively move in either the first or second direction across the grid, and
      two motors associated with each of the first and second sets of wheels, wherein a first motor of the two motors is configured to lift or lower two of the wheels of the associated first or second set of wheels and a second motor of the two motors is configured to lift or lower the remaining two of the wheels of the associated first or second set disposed on an opposite side of the load handling device, wherein the two motors associated with the first set of wheels operate to lift or lower the first set of wheels at the same time to control engagement with the first set of rails or tracks; and
      the two motors associated with the second set of wheels operate to lift or lower the second set of wheels at the same time to control engagement with the second set of rails or tracks.

2. A load handling device according to claim 1, wherein the wheel positioning mechanism comprises:
   a member pivotally mounted at its outer end to each of the wheels; and
   two linkages, an inner end of each member being connected to one of the two linkages, the upper ends of both linkages being connected to a lower end of a common linkage.

3. A load handling device according to claim 2, in which the wheel positioning mechanism comprises:
   motor means acting on the common linkage, the motor means acting so as to draw the common linkage upwardly.

4. A load handling device according to claim 3, in which the motor means comprises:
   the first or second motor, or a solenoid, or a worm gear, or a lead screw mechanism.

5. A load handling device according to claim 1, the wheel positioning mechanism comprising:
   movable side panels on respective sides of the load handling device, the wheels disposed on each side of the load handling device being rotatably attached to the moveable side panels.

6. A load handling device according to claim 5, wherein the wheels mounted on each side of the load handling device are mounted in a frame structure of the load handling device.

7. A load handling device according to claim 6, wherein the frame structure is arranged around the cavity.

8. A load handling device according to claim 7, wherein the cavity is bounded on four sides by the frame structure.

9. A load handling device according to claim 5, wherein the cavity is defined within the frame structure.

10. A load handling device according to claim 1, wherein the wheel assembly comprises:
    one or more of the wheels driven by a motor integrated with the wheel or located adjacent to the wheel.

11. A load handling device according to claim 1, wherein one or more of the wheels comprises:
    a wheel hub motor.

12. A load handling device according to claim 1, wherein one or more of the wheels is driven by one or more motors located above the cavity.

13. A load handling device according to claim 12, comprising:
    drive transfer means disposed around the cavity for transferring drive from the or each motor to the or each wheel.

14. A load handling device according to claim 13, wherein the drive transfer means comprises:
    an arrangement of pulleys and drive belts.

15. A load handling device according to claim 1, wherein one or more of the wheels comprises:
   a channel that cooperates with a drive belt for driving the wheel.

16. A load handling device according to claim 1, wherein the wheels disposed on respective sides of the load handling device are rotatably attached to moveable side panels of each respective side of the load handling device, the moveable side panels comprising:
   a pin and track mechanism, with pins locating in the tracks when the panels are in situ on the sides of the load handling devices.

17. A load handling device according to claim 16, the side panels comprising:
   a motor or solenoid that moves each pin laterally in the track, a shape of the track in an inside of the panels and movement of the pins in the tracks being configured to cause the side panels to be displaced upwardly or downwardly depending on a direction of travel of the pin in the track such that movement in the panel causes the wheels associated with each panel to lift off the track or rails or engage the track or rails accordingly.

18. A load handling device according to claim 17, in which the side panels are mounted to a body of an upper part of the vehicle by way of rails, the rails being fixed to the body, and the pin being slidably mounted to the rails.

19. A load handling device according to claim 1, in combination with the storage system.

20. A load handling device for lifting and moving containers stacked in stacks in a storage system, the storage system having a plurality of rails or tracks arranged in grid pattern above the stacks of containers, the grid pattern having a plurality of grid spaces, each stack being located within a footprint of only a single grid space, the load handling device being configured to move laterally on the rails or tracks above the stacks, the load handling device comprising:
   a lifting mechanism, the lifting mechanism having a gripper device configured to grip a container from above;
   a vehicle body having an upper portion and a lower portion, the upper portion for housing components including power components, and/or control components, and/or drive components and/or lifting components, and the lower portion arranged directly beneath the upper portion, the lower portion having a cavity for accommodating a container and a wheel assembly, the wheel assembly having a first set of wheels for engaging with a first set of rails or tracks to guide movement of the device in a first direction and a second set of wheels for engaging with a second set of rails or tracks to guide movement of the device in a second direction, wherein the second direction is transverse to the first direction;
   the lifting mechanism being configured to raise and lower the gripper device relative to the cavity, the lifting mechanism being located above the cavity; and
   the wheel assembly having a wheel positioning mechanism, the wheel positioning mechanism having:
      means for selectively engaging either the first set of wheels with the first set of rails or tracks or the second set of wheels with the second set of rails or tracks thereby enabling the load handling device to selectively move in either the first or second direction across the grid, and
      two motors associated with each of the first and second sets of wheels, wherein a first motor of the two motors to move two of the wheels of the associated set of wheels and a second motor of the two motors to move a remaining two of the wheels of the associated set disposed on an opposite side of the load handling device such that one of the two motors acts to lift one set of wheels only, wherein the two motors are configured to operate independently, each motor being configured so as to lift or lower one set of wheels at any time and include means for lifting the wheels clear of the tracks or rails.

21. A load handling device according to claim 20, wherein the wheel positioning mechanism comprises:
   a member pivotally mounted at its outer end to each of the wheels; and
   two linkages, an inner end of each member being connected to one of the two linkages, the upper ends of both linkages being connected to a lower end of a common linkage.

22. A load handling device according to claim 21, in which the wheel positioning mechanism comprises:
   motor means acting on the common linkage, the motor means acting so as to draw the common linkage upwardly.

23. A load handling device according to claim 22, in which the motor means comprises:
   the first or second motor, or a solenoid, or a worm gear, or a lead screw mechanism.

24. A load handling device according to claim 20, the wheel positioning mechanism comprising:
   movable side panels on respective sides of the load handling device, the wheels disposed on each side of the load handling device being rotatably attached to the moveable side panels.

25. A load handling device according to claim 24, wherein the wheels mounted on each side of the load handling device are mounted in a frame structure of the load handling device.

26. A load handling device according to claim 25, wherein the frame structure is arranged around the cavity.

27. A load handling device according to claim 26, wherein the cavity is bounded on four sides by the frame structure.

28. A load handling device according to claim 24, wherein the cavity is defined within the frame structure.

29. A load handling device according to claim 20, wherein the wheel assembly comprises:
   one or more of the wheels driven by a motor integrated with the wheel or located adjacent to the wheel.

30. A load handling device according to claim 20, wherein one or more of the wheels comprises:
   a wheel hub motor.

31. A load handling device according to claim 20, wherein one or more of the wheels is driven by one or more motors located above the cavity.

32. A load handling device according to claim 31, comprising: drive transfer means disposed around the cavity for transferring drive from the or each motor to the or each wheel.

33. A load handling device according to claim 32, wherein the drive transfer means comprises:
   an arrangement of pulleys and drive belts.

34. A load handling device according to claim 20, wherein one or more of the wheels comprises:
   a channel that cooperates with a drive belt for driving the wheel.

35. A load handling device according to claim 20, wherein the wheels disposed on respective sides of the load handling device are rotatably attached to moveable side panels of each respective side of the load handling device, the movable side panels comprising:

a pin and track mechanism, with pins locating in the tracks when the panels are in situ on the sides of the load handling devices.

36. A load handling device according to claim 35, the side panels comprising:

a motor or solenoid that moves each pin laterally in the track, a shape of the track in an inside of the panels and movement of the pins in the tracks being configured to cause the side panels to be displaced upwardly or downwardly depending on a direction of travel of the pin in the track such that movement in the panel causes the wheels associated with each panel to lift off the track or rails or engage the track or rails accordingly.

37. A load handling device according to claim 36, in which the side panels are mounted to a body of an upper part of the vehicle by way of rails, the rails being fixed to the body, and the pin being slidably mounted to the rails.

38. A load handling device according to claim 20, in combination with the storage system.

\* \* \* \* \*